(12) United States Patent
Idogawa

(10) Patent No.: US 10,041,425 B2
(45) Date of Patent: Aug. 7, 2018

(54) AIR-FUEL RATIO CONTROLLER OF INTERNAL COMBUSTION ENGINE AND METHOD FOR CONTROLLING AIR-FUEL RATIO OF INTERNAL COMBUSTION ENGINE

(71) Applicant: TOYOTA JIDOSHA KABUSHIKI KAISHA, Toyota-shi, Aichi-ken (JP)

(72) Inventor: Masanao Idogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/608,537

(22) Filed: May 30, 2017

(65) Prior Publication Data
US 2017/0370313 A1 Dec. 28, 2017

(30) Foreign Application Priority Data
Jun. 27, 2016 (JP) .................. 2016-126659

(51) Int. Cl.
| | |
|---|---|
| *F02D 41/14* | (2006.01) |
| *F02D 41/02* | (2006.01) |
| *F02D 41/00* | (2006.01) |
| *F02D 41/04* | (2006.01) |
| *F02D 41/24* | (2006.01) |
| *F02D 41/34* | (2006.01) |
| *F01N 11/00* | (2006.01) |

(52) U.S. Cl.
CPC ..... *F02D 41/0295* (2013.01); *F02D 41/0052* (2013.01); *F02D 41/047* (2013.01); *F02D 41/2461* (2013.01); *F02D 41/34* (2013.01); *F01N 11/007* (2013.01); *F02D 2200/021* (2013.01); *F02D 2200/0614* (2013.01)

(58) Field of Classification Search
CPC .... F02D 41/0295; F02D 41/34; F02D 41/047; F02D 41/0052; F02D 41/2461; F02D 41/2454; F02D 2041/1415; F02D 2200/0614; F02D 2200/021; F01N 11/007
USPC ......................... 123/672, 674, 689; 701/103
See application file for complete search history.

(56) References Cited

U.S. PATENT DOCUMENTS

| | | | |
|---|---|---|---|
| 5,577,486 | A | 11/1996 | Harima et al. |
| 5,615,660 | A | 4/1997 | Iwano et al. |

(Continued)

FOREIGN PATENT DOCUMENTS

| | | |
|---|---|---|
| DE | 60303405 T2 | 9/2006 |
| JP | S63-239334 A | 10/1988 |

(Continued)

*Primary Examiner* — Hai Huynh
(74) *Attorney, Agent, or Firm* — Oliff PLC

(57) ABSTRACT

An air-fuel ratio controller of an internal combustion engine includes an open-loop processor setting a base injection amount, a feedback processor calculating a feedback operation amount, an increase processor performing an increase correction on the base injection amount when a temperature of the internal combustion engine is a specified temperature or lower, an operation processor operating a fuel injection valve based on the corrected base injection amount and that is corrected using the feedback operation amount and a learning value, and an update processor updating the learning value. If the increase processor performs the increase correction, the update processor updates the learning value to increase an increase correction rate of the base injection amount when a temperature of the cylinder wall surface is high.

10 Claims, 9 Drawing Sheets

(56) References Cited

U.S. PATENT DOCUMENTS

| | | |
|---|---|---|
| 7,168,422 B1 | 1/2007 | Takata |
| 2003/0200958 A1 | 10/2003 | Ito et al. |
| 2004/0040541 A1 | 3/2004 | Goto et al. |
| 2009/0271091 A1 | 10/2009 | Morita |

FOREIGN PATENT DOCUMENTS

| | | |
|---|---|---|
| JP | H07-071304 A | 3/1995 |
| JP | H08-4579 A | 1/1996 |
| JP | H08-246920 A | 9/1996 |
| JP | 2004-353490 A | 12/2004 |
| JP | 2007-127029 A | 5/2007 |
| JP | 2008-025502 A | 2/2008 |
| JP | 2008-223529 A | 9/2008 |
| JP | 2009-024598 A | 2/2009 |

AIR-FUEL RATIO CONTROLLER OF INTERNAL COMBUSTION ENGINE AND METHOD FOR CONTROLLING AIR-FUEL RATIO OF INTERNAL COMBUSTION ENGINE

BACKGROUND

The present disclosure relates to an air-fuel ratio controller of an internal combustion engine.

When a fuel injection valve is operated based on a base injection amount, which is an operation amount of an open-loop control that sets the air-fuel ratio to a target value, the actual air-fuel ratio is deviated from the target value due to deviations in the injection performance of the fuel injection valve from the reference performance or deviations of the actual cylinder intake air amount from a cylinder intake air amount used to calculate the base injection amount. In this regard, when the fuel injection valve is operated through a feedback control in addition to the open-loop control, which uses the base injection amount, the feedback operation amount compensates for the deviation of the actual air-fuel ratio from the target value described above (error of air-fuel control caused by base injection amount). Additionally, a known air-fuel ratio control learns a compensation amount that compensates for an error of the air-fuel ratio control caused by the base injection amount as a learning value.

Japanese Laid-Open Patent Publication No. H8-4579 describes an example of an air-fuel ratio controller that learns a learning value. The device updates the learning value based on a feedback operation amount of the air-fuel ratio when the base injection amount is corrected by an increase of a warm-up increase amount (low temperature increase amount), which is the amount of fuel increased when the temperature is low. The device updates the learning value based on a value obtained by adding a correction amount corresponding to the increase correction to a correction rate of the base injection amount corresponding to the feedback operation amount.

As described above, when the increase correction is performed on the base injection amount, a portion of the increased fuel does not collect on, for example, a cylinder wall surface and contributes to enrichment of the exhaust air-fuel ratio. The feedback operation amount is changed in correspondence with the portion of the fuel that is increased by the low temperature increase amount and contributes to the enrichment of the exhaust air-fuel ratio.

The proportion of the fuel contributing to the enrichment of the exhaust air-fuel ratio changes in accordance with the temperature of the cylinder wall surface of the cylinder even when the increase correction rate of the base injection amount corresponding to the low temperature increase amount is the same. Thus, as performed in the above device, only the addition of the correction amount corresponding to the low temperature increase amount to the correction rate of the base injection amount corresponding to the feedback operation may cause the learning value to be mislearned, that is, the updating of the learning value is largely affected by the portion of the fuel increased by the low temperature increase amount and contributing to the enrichment of the exhaust air-fuel ratio, depending on the temperature of the cylinder wall surface. More specifically, the learning value may be updated to a value that is largely deviated from the value appropriate for compensating for an error of the air-fuel control caused by deviations in the injection performance of the fuel injection valve from the reference performance or deviations of the actual cylinder intake air amount from the cylinder intake air amount used to calculate the base injection amount.

SUMMARY

It is an object of the present invention to provide an air-fuel ratio controller of an internal combustion engine that limits mislearning of a learning value regardless of the temperature of a cylinder wall surface when a low temperature increasing process is performed.

To achieve the above object, an air-fuel ratio controller of an internal combustion engine includes an open-loop processor, a feedback processor, an increase processor, an operation processor, and an update processor. The open-loop processor is configured to set a base injection amount, which is an open-loop operation amount that controls an air-fuel ratio to a target value. The feedback processor is configured to calculate a feedback operation amount that controls a detected value of the air-fuel ratio, which is obtained by an air-fuel ratio sensor arranged in an exhaust passage of an internal combustion engine, to the target value. The increase processor is configured to perform an increase correction on the base injection amount when a temperature of the internal combustion engine is lower than or equal to a specified temperature. The operation processor is configured to operate a fuel injection valve based on the base injection amount on which the increase processor has performed the increase correction. The base injection amount is corrected using the feedback operation amount and a learning value. The update processor is configured to update the learning value based on the feedback operation amount. The internal combustion engine includes a cylinder wall surface. If the increase processor performs the increase correction, when a temperature of the cylinder wall surface is high, the update processor is configured to update the learning value so that the learning value increases an increase correction rate of the base injection amount as compared to when the temperature of the cylinder wall surface is low.

In the above configuration, the base injection amount, which is corrected by the feedback operation amount and the learning value, is the value that controls the air-fuel ratio to the target value. Thus, when the base injection amount is further corrected and increased by the increase processor, the correction amount increased by the increase processor may partially contribute to enrichment of the exhaust air-fuel ratio. The amount that may contribute to enrichment is increased when the temperature of a cylinder wall surface is high as compared to when the temperature is low. This indicates that when the temperature of the cylinder wall surface is high, the exhaust air-fuel ratio is deviated from the target value toward a richer side than when the temperature is low even if the increase processor increases the base injection amount by the same increase correction rate. Thus, when the temperature of the cylinder wall surface is high, the feedback operation amount sets the exhaust air-fuel ratio to a leaner side than when the temperature is low even if the increase processor increases the base injection amount by the same increase correction rate. Therefore, when the temperature of the cylinder wall surface is high, the feedback operation amount sets the exhaust air-fuel ratio to the leaner side at a higher rate than when the temperature is low.

In this regard, in the above configuration, when the temperature of the cylinder wall surface is high, the update processor updates the learning value to a value that increases the increase correction rate of the base injection amount more than when the temperature is low. This reduces the effect of changes in the feedback operation amount as a result of the increase correction with high accuracy. Thus, mislearning of the learning value is limited regardless of the temperature of the cylinder wall surface when the increase correction is performed.

The phrase of "update the learning value so that the learning value increases an increase correction rate" includes, for example, updating of the learning value so that a decrease correction rate is reduced when the feedback operation amount is a value corresponding to a decrease correction of the base injection amount.

The air-fuel ratio controller further includes an enrichment processor configured to set the target value to be rich when the increase processor performs the increase correction as compared to when the increase processor does not perform the increase correction.

If the air-fuel ratio is the same, when the temperature of the internal combustion engine is low, the fuel combustion speed tends to be lowered as compared to when the temperature is high. In this regard, in the above configuration, when the engine is driven at a low temperature, the target value is set to be richer than when the engine is driven at a high temperature. This enriches the air-fuel ratio of the mixture supplied to the combustion chamber for combustion as compared to that of the high temperature driving. Thus, the high combustion speed is maintained during the low temperature driving. Further, in this case, the base injection amount is set to an injection amount that controls the air-fuel ratio to the enriched target value. This limits the effect of the fuel increase, which enriches the air-fuel ratio of the mixture supplied to the combustion chamber 24 for combustion, on the feedback operation amount.

The phrase of "set the target value to be rich" means that under a condition in which the operating point of the internal combustion engine determined based on the rotation speed and the load of the internal combustion engine is the same, when the increase correction is performed, the target value of the air-fuel ratio is set to be richer than when the increase correction is not performed.

The update processor includes an air amount accumulation processor configured to calculate an accumulated air amount, which is an accumulated amount of an intake air amount of the internal combustion engine. The update processor is configured to update the learning value using the accumulated air amount as a parameter that correlates with the temperature of the cylinder wall surface.

The accumulated air amount is a parameter having a strong positive correlation with an accumulated amount of combustion energy in the combustion chamber. The temperature of the cylinder wall surface has a strong positive correlation with the accumulated amount of combustion energy in the combustion chamber. With reference to the correlations, in the above configuration, the temperature of the cylinder wall surface is determined to be higher when the accumulated air amount is large than when small.

The update processor includes an injection amount accumulation processor configured to calculate an accumulated injection amount, which is an accumulated amount of the base injection amount. The update processor is configured to update the learning value using the accumulated injection amount as a parameter that correlates with the temperature of the cylinder wall surface.

The accumulated injection amount is a parameter having a strong positive correlation with an accumulated amount of combustion energy in the combustion chamber. The temperature of the cylinder wall surface has a strong positive correlation with the accumulated amount of combustion energy in the combustion chamber. With reference to the correlations, in the above configuration, the temperature of the cylinder wall surface is determined to be higher when the accumulated injection amount is large than when small.

The internal combustion engine includes a combustion chamber. The update processor includes a heat amount calculation processor configured to calculate a heat amount generated in the combustion chamber of the internal combustion engine based on time series data of a detected value of pressure of the combustion chamber of the internal combustion engine. The update processor is configured to update the learning value using the heat amount as a parameter that correlates with the temperature of the cylinder wall surface.

The amount of heat generated in the combustion chamber is a parameter having a strong positive correlation with the temperature of the cylinder wall surface. With reference to the correlation, in the above configuration, the learning value is updated while the temperature of the cylinder wall surface is acknowledged based on the heat amount.

The internal combustion engine includes coolant. The update processor is configured to update the learning value based on the parameter and a temperature of the coolant.

When the temperature of the coolant is high, the temperature of the cylinder wall surface is higher than when the temperature of the coolant is low even if the accumulated air amount, the accumulated injection amount, and the amount of heat generated in the combustion chamber are the same. Thus, in the above configuration, the temperature of the cylinder wall surface is acknowledged taking into consideration the temperature of the coolant.

The learning value includes a high temperature learning value, which is used when the temperature of the internal combustion engine is higher than a predetermined temperature, and a low temperature learning value, which is used when the temperature of the internal combustion engine is lower than or equal to the predetermined temperature. When the temperature of the internal combustion engine is higher than the specified temperature, the operation processor is configured to operate the fuel injection valve based on the base injection amount that is corrected using the feedback operation amount and the learning value. The predetermined temperature is higher than or equal to the specified temperature. When the increase processor performs the increase correction, the update processor is configured to update the low temperature learning value.

When the internal combustion engine is driven at a low temperature, the fuel is not easily vaporized as compared to when the internal combustion engine is driven at a high temperature. Thus, when the base injection amount is the same, variations in the exhaust air-fuel ratio tend to differ between the low temperature driving and the non-low temperature driving. In this regard, in the above configuration, the learning value includes the low temperature learning value and the high temperature learning value. This allows the learning values to be appropriately used in accordance with the temperature of the internal combustion engine.

The feedback processor includes an integral element to which a difference between he detected value and the target value is input. The feedback operation amount is calculated based on an output value of the integral element. The air-fuel ratio controller further includes an addition processor configured to add a difference value, which is obtained by subtracting the high temperature learning value from the low temperature learning value, to a value held in the integral element when the learning value that is used to correct the base injection amount is switched from the low temperature learning value to the high temperature learning value.

When the low temperature learning value differs from the high temperature learning value, the injection amount of the fuel injection valve may be changed in a stepped manner when the learning value used to correct the base injection amount is switched from the low temperature learning value to the high temperature learning value. In this regard, in the above configuration, the difference value is added to the value held by the integral element. This limits changes in the injection amount in a stepped manner that is caused by the switching. Additionally, subsequent to the switching, the feedback control updates the integral element. Thus, even if the value held in the integral element is deviated from the value appropriate to the feedback control that controls the detected value of the air-fuel ratio to the target value, such a deviation is smoothly changed to the proper value by updating the value held in the integral element. When the value held in the integral element is appropriate to the feedback control that controls the detected value of the air-fuel ratio to the target value and the absolute value of the held value is greater than zero, the value held in the integral element is updated by updating the high temperature learning value. This smoothly decreases the absolute value of the value held in the integral element.

To achieve the above object, a method for controlling an air-fuel ratio of an internal combustion engine includes setting a base injection amount, which is an open-loop operation amount that controls an air-fuel ratio to a target value; calculating a feedback operation amount that controls a detected value of the air-fuel ratio, which is obtained by an air-fuel ratio sensor arranged in an exhaust passage of an internal combustion engine, to the target value; performing an increase correction on the base injection amount when a temperature of the internal combustion engine is lower than or equal to a specified temperature; operating a fuel injection valve based on the base injection amount on which the increase correction has been performed and that is corrected using the feedback operation amount and a learning value; and updating the learning value based on the feedback operation amount. The internal combustion engine includes a cylinder wall surface. If the increase correction is performed, when a temperature of the cylinder wall surface is high, the learning value is updated so that the learning value increases an increase correction rate of the base injection amount as compared to when the temperature of the cylinder wall surface is low.

To achieve the above object, an air-fuel ratio controller of an internal combustion engine that includes circuitry configured to set a base injection amount, which is an open-loop operation amount that controls an air-fuel ratio to a target value; calculate a feedback operation amount that controls a detected value of the air-fuel ratio, which is obtained by an air-fuel ratio sensor arranged in an exhaust passage of an internal combustion engine, to the target value; perform an increase correction on the base injection amount when a temperature of the internal combustion engine is lower than or equal to a specified temperature; operate a fuel injection valve based on the base injection amount on which the increase correction has been performed and that is corrected using the feedback operation amount and a learning value; and update the learning value based on the feedback operation amount. The internal combustion engine includes a cylinder wall surface. If the increase correction is performed, when a temperature of the cylinder wall surface is high, the learning value is updated so that the learning value increases an increase correction rate of the base injection amount as compared to when the temperature of the cylinder wall surface is low.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

First Embodiment

A first embodiment of an air-fuel ratio controller of an internal combustion engine will now be described with reference to the drawings.

Figure 1:
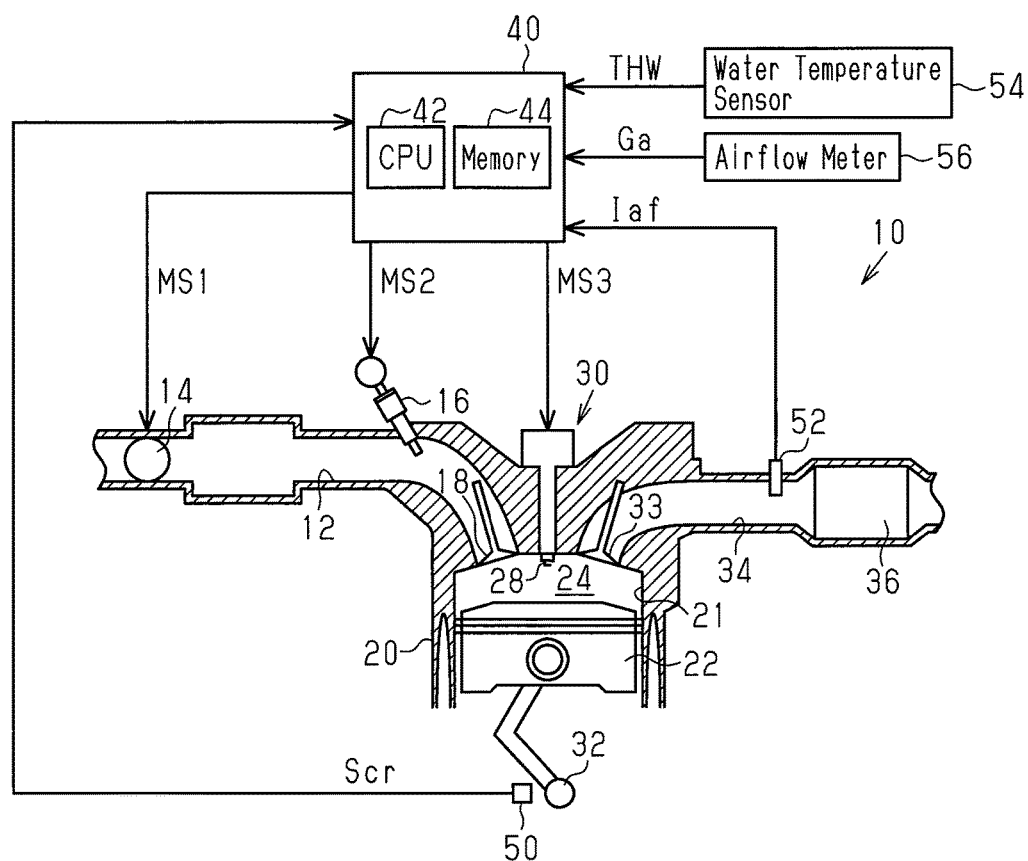
FIG. 1 is a diagram of a first embodiment of an air-fuel ratio controller and an internal combustion engine.

FIG. 1 shows a multiple-cylinder internal combustion engine 10 of a spark ignition type. The internal combustion engine 10 includes an intake passage 12, in which an electrically-controlled throttle valve 14 is arranged to change the cross-sectional area of the flow passage. The intake passage 12 includes a port injection valve 16, which is arranged at a downstream side of the throttle valve 14 to inject a fuel into an intake port. When an intake valve 18 is opened, the air of the intake passage 12 and the fuel injected by the port injection valve 16 fill a combustion chamber 24, which is defined by a cylinder 20 and a piston 22. An ignition device 30 includes a spark plug 28, which projects into the combustion chamber 24. The spark plug 28 produces sparks to ignite and combust the mixture of the air and the fuel. The combustion energy of the air-fuel mixture is partially converted into rotation energy of a crankshaft 32 by reciprocation of the piston 22 along a wall surface of the cylinder 20 (cylinder wall surface 21).

The combusted air-fuel mixture is discharged to an exhaust passage 34 as exhaust gas when an exhaust valve 33 is opened. The exhaust passage 34 accommodates a catalyst 36 such as a three-way catalytic converter.

The internal combustion engine 10 is the subject that is controlled by a controller 40. The controller 40 operates, for example, the port injection valve 16 and an actuator of, for example, the ignition device 30 to control the control amounts (torque, exhaust component). When performing the above control, the controller 40 receives output values from various kinds of sensors such as a crank angle sensor 50, which detects the rotational angle of the crankshaft 32, an air-fuel ratio sensor 52, which detects the air-fuel ratio, a water temperature sensor 54, which detects the temperature of coolant (water temperature THW), and an airflow meter 56, which detects an intake air amount Ga.

The air-fuel ratio sensor 52, which is arranged in the exhaust passage 34 at an upstream side of the catalyst 36, detects an exhaust air-fuel ratio based on the exhaust component in the exhaust passage 34 and outputs the exhaust air-fuel ratio as an output value Iaf. Here, the exhaust air-fuel ratio of the target exhaust is defined as the air-fuel ratio of a virtual air-fuel mixture. The virtual air-fuel mixture is a mixture that only contains fresh air and fuel. The exhaust produced by combustion of the virtual air-fuel mixture has an unburned fuel concentration (e.g., HC), an imperfect combustion component concentration (e.g., CO), and an oxygen concentration that are the same as the unburned fuel concentration, the imperfect combustion component concentration, and the oxygen concentration of the target exhaust. The combustion of the virtual air-fuel mixture is not limited to a combustion in which each of the unburned fuel concentration and the imperfect combustion component concentration is zero or a value that is assumed to be zero, a combustion in which the oxygen concentration is zero or a value that is assumed to be zero, or a combustion in which each of the unburned fuel concentration, the imperfect combustion component concentration, and the oxygen concentration is zero or a value that is assumed to be zero. The combustion of the virtual air-fuel mixture also includes a combustion in which all of the unburned fuel concentration, the imperfect combustion component concentration, and the oxygen concentration are greater than zero.

Figure 2:
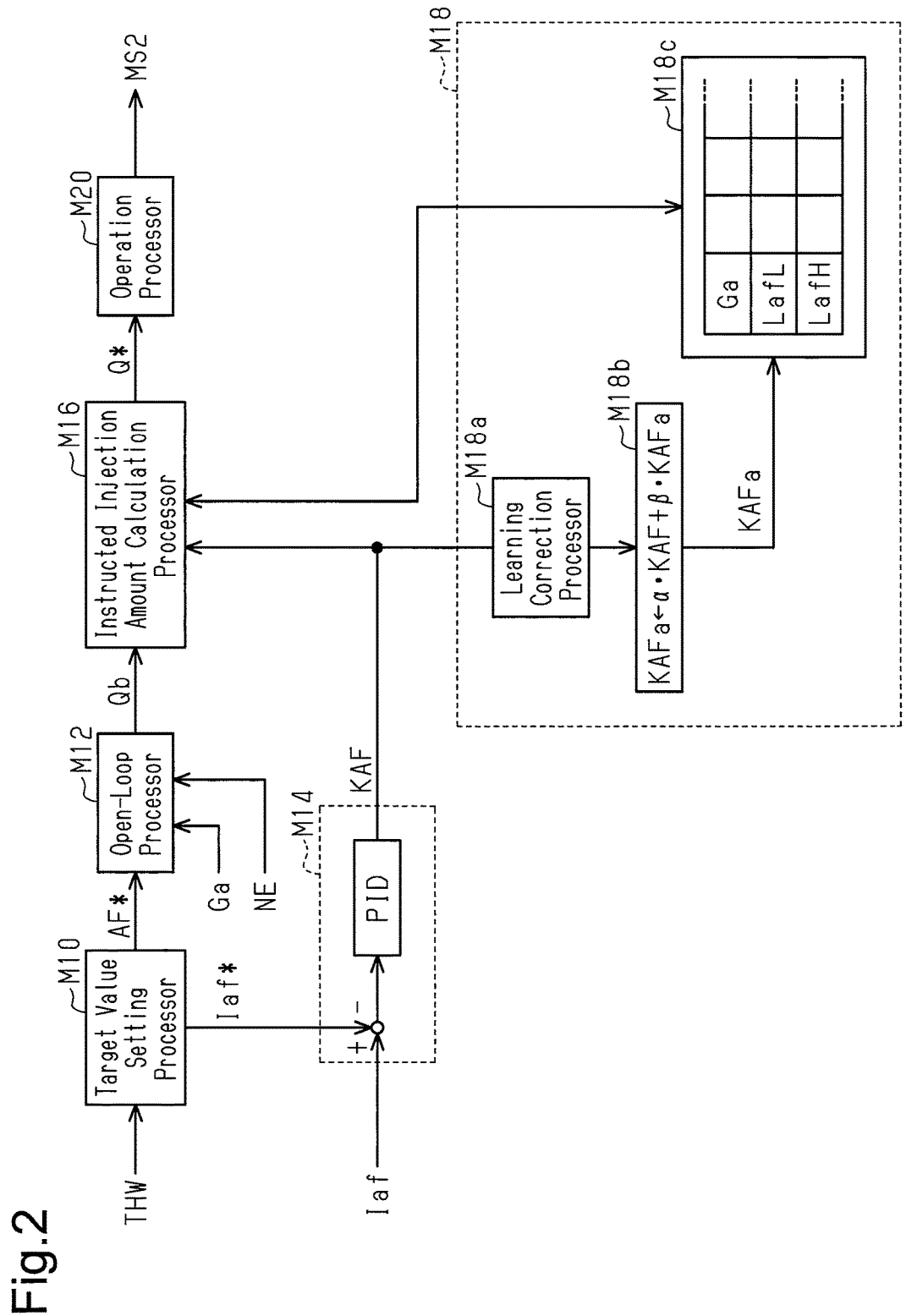
FIG. 2 is a block diagram showing a portion of a process performed by the air-fuel ratio controller shown in FIG. 1.

The controller 40 includes a central processing unit 42 (CPU) and a memory 44. The CPU 42 executes programs stored in the memory 44 to perform the above control. FIG. 2 shows a portion of processes executed by the CPU 42 in accordance with the programs stored in the memory 44.

A target value setting processor M10 sets a target value AF* of the air-fuel ratio of the mixture supplied to the combustion chamber 24 for combustion. In the present embodiment, the target value setting processor M10 basically sets the target value AF* to the stoichiometric air-fuel ratio. However, when the water temperature THW, which is a parameter correlated with the temperature of the internal combustion engine 10, is lower than or equal to a specified temperature Tth, the target value setting processor M10 sets the target value AF* to be richer than the stoichiometric air-fuel ratio. When the temperature of the internal combustion engine 10 is low, the fuel combustion speed tends to be lowered. In this regard, when the temperature is low, the above setting is configured to obtain the same level of the combustion speed as when the temperature is high. More specifically, even when the operating point of the internal combustion engine 10 that is determined based on the load and the rotation speed of the internal combustion engine 10 is the same, if the water temperature THW is lower than or equal to the specified temperature Tth, the target value AF* is set to be richer than when the water temperature THW is higher than the specified temperature Tth. The specified temperature Tth may be set, for example, to a value of approximately 40° C. to 80° C.

In addition to setting the target value AF*, the target value setting processor M10 sets a target value Iaf* of the output value Iaf of the air-fuel ratio sensor 52 corresponding to the target value AF*.

Based on the target value AF*, an open-loop processor M12 calculates a base injection amount Qb as an open-loop operation amount that controls the air-fuel ratio of the combustion chamber 24 to the target value AF*. More specifically, the open-loop processor M12 calculates the base injection amount Qb based on the amount of air drawn into the combustion chamber 24, which is determined based on the intake air amount Ga and a rotation speed NE, and the target value AF*. The rotation speed NE is calculated based on an output signal Scr of the crank angle sensor 50.

A feedback processor M14 calculates a feedback operation amount KAF that controls the output value Iaf to the target value Iaf*. More specifically, the feedback processor M14, which includes a proportional element, an integral element, and a differential element, calculates the feedback operation amount KAF based on the sum of output values of the proportional element, the integral element, and the differential element. In the present embodiment, the feedback operation amount KAF is a parameter that represents a correction rate of the base injection amount Qb. When the feedback operation amount KAF is "1," the correction rate is "0."

An instructed injection amount calculation processor M16 calculates an instructed injection amount Q* based on the base injection amount Qb, the feedback operation amount KAF, and one of low temperature learning values LafL and high temperature learning values LafH, which are shown in FIG. 2. The low temperature learning values LafL and the high temperature learning values LafH are each a parameter that represents a correction rate of the base injection amount Qb. When each of the learning values LafL, LafH is "1," the correction rate is "0."

Figure 3:
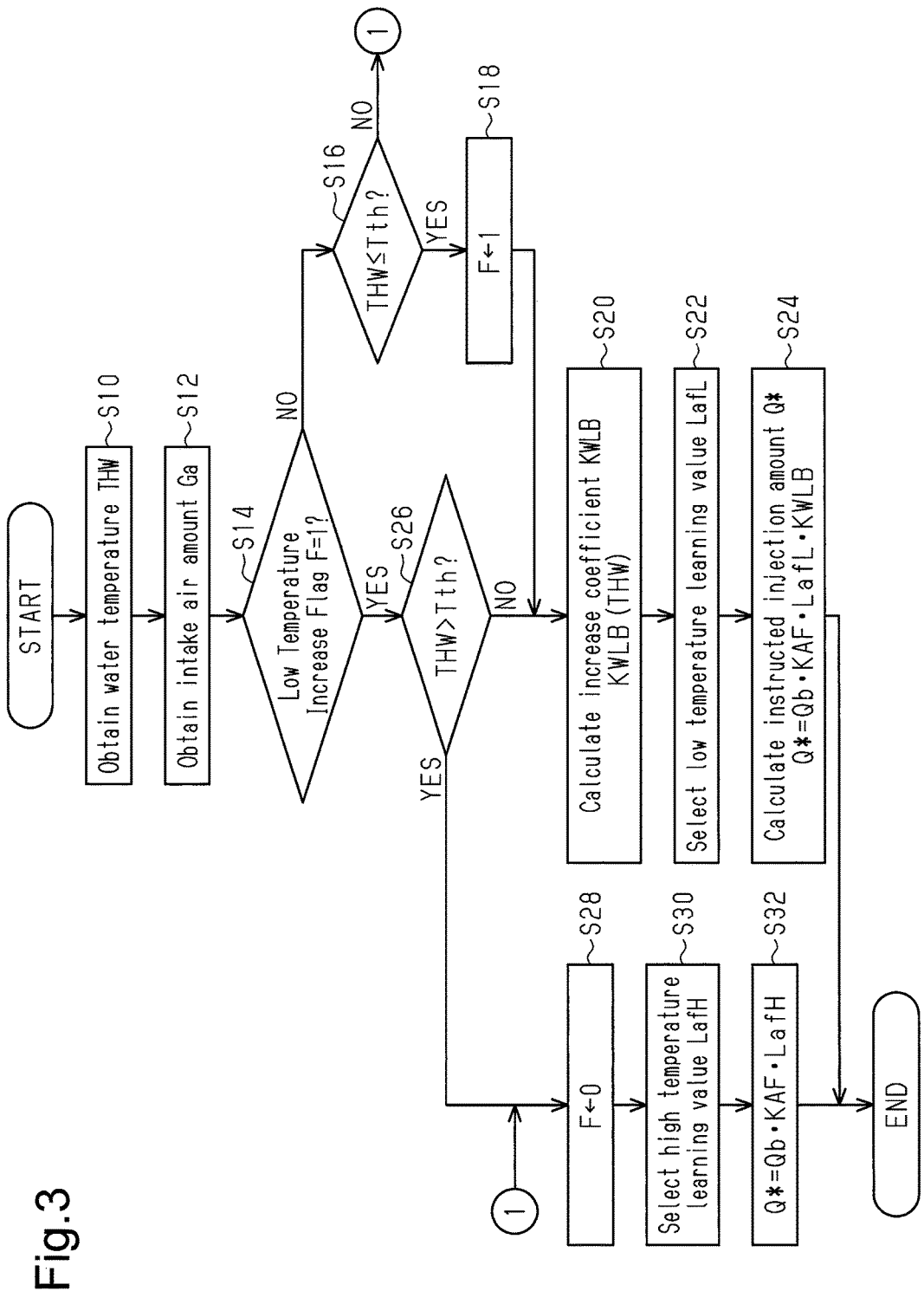
FIG. 3 is a flowchart showing the procedures of a process performed by an instructed injection amount calculation processor of the air-fuel ratio controller shown in FIG. 1.

FIG. 3 shows the procedures of a process executed by the instructed injection amount calculation processor M16. The process is, for example, repeatedly executed in predetermined cycles. In the description, the CPU 42 functions as a unit executing the process.

In the sequence of the process shown in FIG. 3, the CPU 42 first obtains the water temperature THW (S10) and the intake air amount Ga (S12). Then, the CPU 42 determines whether or not a low temperature increase flag F is "1" (S14). The low temperature increase flag F indicates whether or not a low temperature increasing process, which performs an increase correction on the base injection amount Qb when the temperature of the internal combustion engine 10 is low, is executed. When the CPU 42 does not determine that the low temperature increase flag F is "1" (S14: NO), the CPU 42 determines whether or not the water temperature THW is lower than or equal to the specified temperature Tth (S16). This process is executed for the determination of whether or not the low temperature increasing process be executed. The specified temperature Tth is set to the upper limit value of temperatures at which misfires tend to occur due to the temperature of the internal combustion engine 10 being low.

When the CPU 42 determines that the water temperature TRW is lower than or equal to the specified temperature Tth (S16: YES), the CPU 42 sets the low temperature increase flag F to "1" (S18). The CPU 42 calculates an increase coefficient KWLB of the base injection amount Qb to execute the low temperature increasing process (S20). The increase coefficient KWLB, which has a value greater than "1," is set to be larger when the water temperature THW is low than when the water temperature THW is high. The increase coefficient KWLE is set to a value having a margin so that the required amount of fuel is assuredly combusted even if the internal combustion engine 10 is driven by a low ignitable fuel such as a heavy fuel at a low temperature.

The CPU 42 selects a value (S22) corresponding to the intake air amount Ga obtained in step S12 from the low temperature learning values LafL, which are learning values updated when the low temperature increasing process is executed. This copes with the low temperature learning values LafL that are learned for each region of the intake air amount Ga as shown in FIG. 2.

The CPU 42 calculates the instructed injection amount Q* by multiplying the base injection amount Qb by the feedback operation amount KAF, the low temperature learning value LafL, and the increase coefficient KWLB (S24).

When the CPU 42 determines that the low temperature increase flag F is "1" (S14: YES), the CPU 42 determines whether or not the water temperature THW is higher than the specified temperature Tth (S26). When the CPU 42 determines that the water temperature THW is lower than or equal to the specified temperature Tth (S26: NO), the CPU 42 proceeds to step S20. When the CPU 42 determines that the water temperature THW is higher than the specified temperature Tth (S26: YES), the CPU 42 sets the low temperature increase flag F to "0" (S28).

The CPU 42 selects a value (S30) corresponding to the intake air amount Ga obtained in step S12 from the high temperature learning values LafH, which are learning values updated when the low temperature increasing process is not executed. This copes with the high temperature learning values LafH that are learned for each region of the intake air amount Ga as shown in FIG. 2. The CPU 42 calculates the instructed injection amount Q* by multiplying the base injection amount Qb by the feedback operation amount KAF and the high temperature learning value LafH (S32).

When each of steps S24, S32 is completed, the CPU 42 temporarily ends the sequence of the process shown in FIG. 3.

Referring to FIG. 2, an operation processor M20 generates an operation signal MS2 for operating the port injection valve 16 based on the instructed injection amount Q* and transmits the operation signal MS2 to the port injection valve 16.

The low temperature learning values LafL and the high temperature learning values LafH are generated by an update processor M18 based on the feedback operation amount KAF. The update processor M18 will now be described.

The feedback operation amount KAF is input to a learning correction processor M18a. When the low temperature increasing process is executed, the learning correction processor M18a corrects the feedback operation amount KAF and transmits the corrected value to an average operation amount calculation processor M18b. When the low temperature increasing process is not executed, the learning correction processor M18a transmits the feedback operation amount KAF to the average operation amount calculation processor M18b without corrections.

The average operation amount calculation processor M18b calculates an average operation amount KAFa obtained by removing fluctuations occurred in a short timescale from the feedback operation amount KAF. As shown in FIG. 2, the average operation amount KAFa is calculated, for example, by a weighted moving average process. More specifically, the updated average operation amount KAFa is calculated by adding a value obtained by multiplying the feedback operation amount KAF obtained at a timing for updating the average operation amount KAFa by a coefficient a to a value obtained by multiplying the average operation amount KAFa that was held immediately before the update timing by a coefficient β where "0<α<β<1, α+β=1."

A selective learning processor M18c executes a process for updating the learning value based on the average operation amount KAFa.

Figure 4:
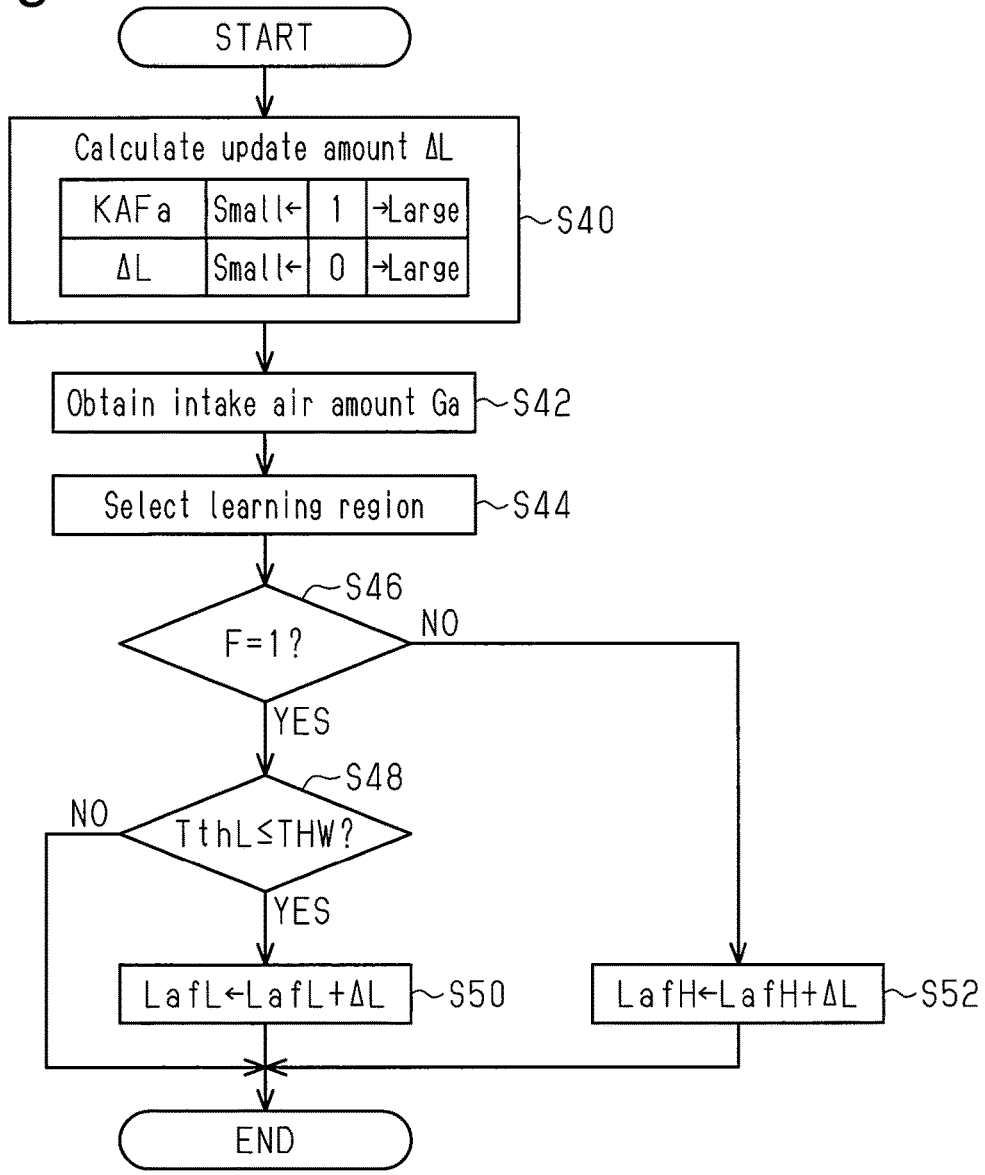
FIG. 4 is a flowchart showing the procedures of a process performed by a selective learning processor of the air-fuel ratio controller shown in FIG. 1.

FIG. 4 shows the procedures of the process executed by the selective learning processor M18c. The process shown in FIG. 4 is, for example, repeatedly executed in predetermined cycles. In the description, the CPU 42 functions as a unit performing the process.

In the sequence of the process shown in FIG. 4, the CPU 42 first calculates an update amount ΔL for each of the learning values LafL, LafH based on the average operation amount KAFa, which is a feedback operation amount used to update the low temperature learning values LafL and the high temperature learning value LafH (S40). More specifically, as the average operation amount KAFa is increased, the update value ΔL becomes larger. As the average operation amount KAFa is decreased, the update value ΔL becomes smaller. When the average operation amount KAFa is "1," the update value ΔL is zero.

Then, the CPU 42 obtains the intake air amount Ga (S42) and selects a learning region based on the intake air amount Ga (S44). The CPU 42 determines whether or not the low temperature increase flag F is "1" (S46). When the CPU 42 determines that the low temperature increase flag F is "1" (S46: YES), the CPU 42 determines whether or not the water temperature THW is greater than or equal to an allowed lower limit value TthL, which is lower than the specified temperature Tth (S48). The allowed lower limit value TthL is set to the lower limit value of temperatures that allow the low temperature learning value LafL to be learned as an appropriate value regardless of the fuel property. This copes with the learning values that largely vary depending on the fuel property when the temperature is extremely low. When the CPU 42 determines that the water temperature THW is greater than or equal to the allowed lower limit value TthL (S48: YES), the CPU 42 adds the update value ΔL to the low temperature learning value LafL corresponding to the learning region selected in step S44 to update the low temperature learning value LafL (S50). When the CPU 42 does not determine that the low temperature increase flag F is "1" (S46: NO), the CPU 42 adds the update value ΔL to the high temperature learning value LafH corresponding to the learning region selected in step S44 to update the high temperature learning value LafH (S52).

When each of steps S50, S52 is completed or the negative determination is made in step S48, the CPU 42 temporarily ends the sequence of the process shown in FIG. 4.

Figure 5:
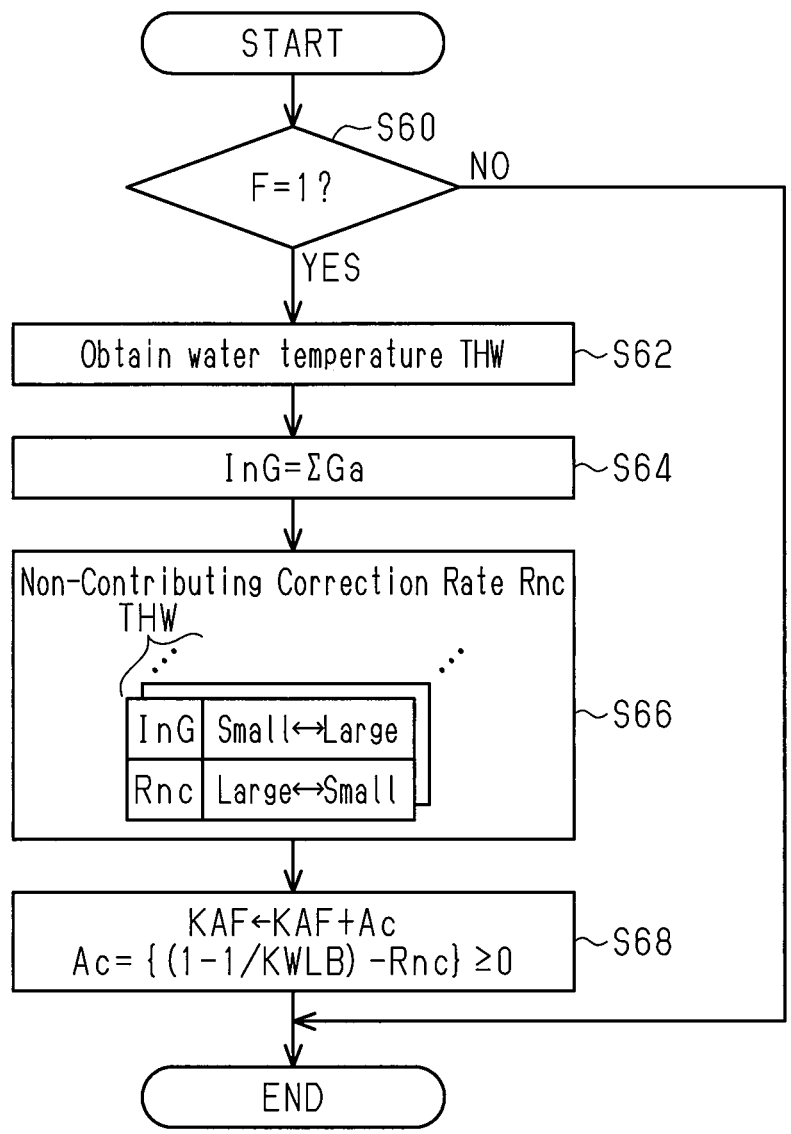
FIG. 5 is a flowchart showing the procedures of a process performed by a learning correction processor of the air-fuel ratio controller shown in FIG. 1.

FIG. 5 shows the procedures of the process executed by the learning correction processor M18a. The process shown in FIG. 5 is, for example, repeatedly executed in predetermined cycles. In the description, the CPU 42 functions as a unit executing the process.

In the sequence of the process shown in FIG. 5, the CPU 42 determines whether or not the low temperature increase flag F is "1" (860). When the CPU 42 determines that the low temperature increase flag F is "1" (S60: YES), the CPU 42 obtains the water temperature TRW (S62). The CPU 42 updates an accumulated air amount InG (S64), which is a value of the air amount Ga accumulated from when the internal combustion engine 10 was started. More specifically, the CPU 42 updates the accumulated air amount InG by adding an air amount Ga that has been drawn from the previous control cycle to the current control cycle of the sequence of the process shown in FIG. 5 to the accumulated air amount InG. The accumulated air amount InG is temporarily initialized to zero when the internal combustion engine 10 is started. Then, the intake air amount Ga is accumulated each time step S64 is executed.

The CPU 42 calculates a non-contributing correction rate Rnc (0<Rnc<1), which indicates the ratio of the amount of fuel that does not contribute to enrichment of the exhaust air-fuel ratio to the amount of surplus fuel injected from the port injection valve 16 by the low temperature increasing process (S66). When the temperature of the cylinder wall surface 21 or the temperature of the wall surface of the intake port (port wall surface) is low, the non-contributing correction rate Rnc becomes larger than when the temperature is high. This is because when the temperature of the cylinder wall surface 21 or the port wall surface is low, a greater amount of fuel is not vaporized and collects on the cylinder wall surface 21 or the port wall surface than when the temperature is high.

More specifically, when the accumulated air amount InG is large, the CPU 42 sets the non-contributing correction rate Rnc to a smaller value than when the accumulated air amount InG is small. This setting is configured because the accumulated air amount InG correlates with the total amount of combustion energy produced in the combustion chamber 24. More specifically, when the total amount of combustion energy is large, the temperature of the cylinder wall surface 21 or the port wall surface becomes higher than when the total amount of combustion energy is small. Additionally, when the water temperature THW is high, the CPU 42 sets the non-contributing correction rate Rnc to a smaller value than when the water temperature THW is low. This copes with the temperature of the cylinder wall surface 21 or the port wall surface that becomes higher as the water temperature THW is increased even when the total amount of combustion energy is the same.

More specifically, the CPU 42 uses a two-dimensional map showing the relationship between each of the accumulated air amount. InG and the water temperature THW and the non-contributing correction rate Rnc to obtain the non-contributing correction rate Rnc from a map calculation. Here, the map refers to data that associates input variables (more specifically, accumulated air amount InG and water temperature THW) with an output variable (more specifically, non-contributing correction rate Rnc). The input variables are each a discrete variable. When the value of an actual input variable for calculating an output variable does not conform to any value of the input variables included in the map, the CPU 42 calculates the value of the output variable through interpolation.

When the CPU 42 calculates the non-contributing correction rate Rnc, the CPU 42 executes a process for eliminating the amount of the exhaust air-fuel ratio that is caused by the low temperature increasing process to deviate toward the rich side from the feedback operation amount KAF based on the non-contributing correction rate Rnc (S68). More specifically, the CPU 42 performs an increase correction that adds an enrichment contribution correction amount Ac to the feedback operation amount KAF. When "(1-1/KWLB)-Rnc" is greater than or equal to zero, the enrichment contribution correction amount Ac is "(1-1/KWLB)-Rnc." When "(1-1/KWLB)-Rnc" is less than zero, the enrichment contribution correction amount Ac is set to zero (guard process).

Here, "1/KWLB" is expected to be a value of the feedback operation amount KAF when it is assumed that only the low temperature increasing process causes the exhaust air-fuel ratio to deviate from the target value Iaf* and the portion increased by the low temperature increasing process entirely contributes to enrichment of the exhaust air-fuel ratio. Thus, "1-1/KWLB" is a decrease amount of the feedback operation amount KAF when it is assumed that only the low temperature increasing process causes the exhaust air-fuel ratio to deviate from the target value Iaf* and the portion increased by the low temperature increasing process entirely contributes to the enrichment of the exhaust air-fuel ratio. However, practically, when the low temperature increasing process is executed, a portion of the fuel collects on the port wall surface or the cylinder wall surface 21 and does not contribute to the enrichment of the exhaust air-fuel ratio. To remove the effect of such a non-contributing portion, the non-contributing correction rate Rnc is subtracted from "1-1/KWLB" to obtain the enrichment contribution correction amount Ac. The enrichment contribution correction amount Ac is added to the feedback operation amount KAF to calculate a value that compensates for the decrease amount of the feedback operation amount KAF caused by the enrichment of the exhaust air-fuel ratio as a result of the low temperature increasing process.

When step S68 is completed or the negative determination is made in step S60, the CPU 42 temporality ends the sequence of the process shown in FIG. 5.

The operation of the present embodiment will now be described.

Figure 6:
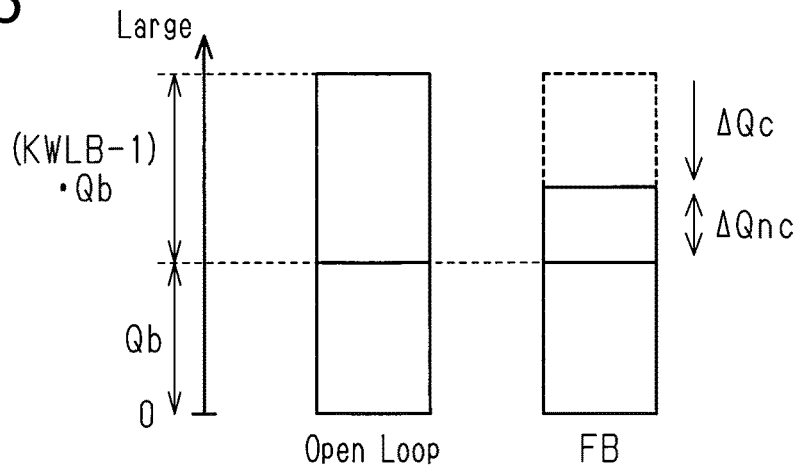
FIG. 6 is a chart of an injection amount corresponding to whether or not the air-fuel ratio controller of FIG. 1 performs feedback.

The left side of FIG. 6 shows an injection amount (in drawing, referred to as "Open Loop") when the feedback operation amount KAF and the low temperature learning value LafL are not used. The injection amount includes the base injection amount Qb and the injection amount of the low temperature increasing process "Qb·(KWLB-1)." When the fuel is injected from the port injection valve 16, the amount of the fuel that contributes to the enrichment of the exhaust air-fuel ratio is referred to as the contributing fuel ΔQc at the right side of FIG. 6. The amount of the fuel that does not contribute is referred to as the non-contributing fuel ΔQnc. The feedback operation amount KAF decreases the contributing fuel ΔQc. The non-contributing fuel ΔQnc has no effect on the feedback operation amount KAF. Thus, in the present embodiment, when the low temperature increasing process is executed, the feedback operation amount KAF, which is used to calculate the low temperature learning value LafL, is corrected by the amount contributing to the enrichment of the exhaust air-fuel ratio as compared to when the low temperature increasing process is not executed.

When a correction that adds the enrichment contribution correction amount Ac to the feedback operation amount KAF is performed, the average operation amount KAFa also undergoes the addition correction. This updates the low temperature learning value LafL to a larger value than when the correction of the enrichment contribution correction amount Ac is not performed even if the feedback operation amount KAF calculated by the feedback processor M14 is the same. In other words, the low temperature learning value LafL is updated so that the increase correction rate of the base injection amount Qb is further increased by the low temperature learning value LafL. In particular, as the non-contributing correction rate Rnc is decreased, the value of the enrichment contribution correction amount Ac becomes larger. Thus, when the non-contributing correction rate Rnc is small, the low temperature learning value LafL is updated to be a further large value than when the non-contributing correction rate Rnc is large even if the feedback operation amount KAF calculated by the feedback processor M14 is the same. When the temperature of the cylinder wall surface 21 is high the non-contributing correction rate Rnc has a smaller value than when the temperature is low. Thus, when the temperature of the cylinder wall surface 21 is high, the low temperature learning value LafL is updated to a further large value than when the temperature is low even if the correction rate of the base injection amount Qb corresponding to the feedback operation amount KAF is the same and the low temperature increasing process uses the same increase correction rate (increase coefficient KWLB) of the base injection amount. In other words, the low temperature learning value LafL is updated so that the increase correction rate of the base injection amount Qb is increased by the low temperature learning value LafL.

described above, in the present embodiment, the low temperature learning value LafL is updated based on the feedback operation amount KAF corrected in accordance with the temperature of the cylinder wall surface 21 in addition to the increase coefficient KWLB. This limits mislearning of the low temperature learning value LafL regardless of the temperature of the cylinder wall surface 21 when the increase correction is performed, If the amount of fuel increased by the low temperature increasing process is reduced by the amount of fuel corresponding to the enrichment contribution correction amount Ac, avoidance of situations in which a combustion failure such as a misfire occurs due to an error of the enrichment contribution correction amount Ac would not be ensured. In this regard, in the present embodiment, the amount of fuel increased by the low temperature increasing process is set to a large value having a margin. When the actual exhaust air-fuel ratio is deviated from the target value AF*, the feedback processor M14 corrects the instructed injection amount Q* so that the actual exhaust air-fuel ratio becomes the target value AF*. This ensures avoidance of combustion failures and controls the exhaust air-fuel ratio to the target value AF*.

The present embodiment further has the advantages described below (1) To maintain a high combustion speed, when the low temperature increasing process is executed, the target value AF* is set to be richer than when the low temperature increasing process is not executed. In this case, the base injection amount Qb is set to an injection amount that allows the air-fuel ratio to become the enriched target value AF*. This limits the effect of the fuel increase, which enriches the air-fuel ratio of the mixture supplied to the combustion chamber 24 for combustion, on the feedback operation amount KAP.

(2) The non-contributing correction rate Rnc is calculated based on the accumulated air amount InG, which strongly correlates with the temperature of the cylinder wall surface 21. Thus, the non-contributing correction rate Rnc is calculated with high accuracy.

(3) Even when the total amount of combustion energy in the combustion chamber 24 is the same, the temperature of the cylinder wall surface 21 varies depending on the internal combustion engine 10. In this regard, the non-contributing correction rate Rnc is calculated based on the water temperature THW. This allows the non-contributing correction rate Rnc to be calculated with higher accuracy than when the non-contributing correction rate Rnc is calculated only from the accumulated air amount InG.

(4) When the internal combustion engine 10 is driven at a low temperature, the fuel is not easily vaporized as compared to when the internal combustion engine 10 is not driven at a low temperature. Thus, when the base injection amount Qb is the same, variations in the exhaust air-fuel ratio tend to differ between the low temperature driving and the non-low temperature driving. In this regard, the low temperature learning values LafL are learned separately from the high temperature learning values LafH. This allows the learning values to be appropriately used in accordance with the temperature of the internal combustion engine 10.

(5) The average operation amount KAFa, which is used to calculate the low temperature learning values LafL, is calculated based on a value that is obtained by correcting the feedback operation amount KAF of the feedback processor M14 based on the non-contributing correction rate Rnc. Thus, when the increase coefficient KWLB and the non-contributing correction rate Rnc are changed in a cycle for updating the low temperature learning values LafL, the above configuration allows the value of the feedback operation amount (average operation amount KAFa), which is used to calculate the low temperature learning value LafL, to be calculated with higher accuracy than a configuration in which the average operation amount KAFa is corrected based on the enrichment contribution correction amount Ac obtained when calculating the update value ΔL, the above configuration allows.

Second Embodiment

A second embodiment of an air-fuel ratio controller of an internal combustion engine will now be described with reference to the drawings. The description will focus on the differences from the first embodiment.

The above low temperature learning values LafL may differ from the above high temperature learning values LafH even when the intake air amount Ga is the same. If the low temperature learning values LafL differ from the high temperature learning values LafH, when the low temperature increasing process ends and the learning value used to correct the base injection amount is switched from the low temperature learning values LafL to the high temperature learning values LafH, the amount of fuel injected from the port injection valve 16 may be changed in a stepped manner. In this regard, the second embodiment executes the process described below.

Figure 7:
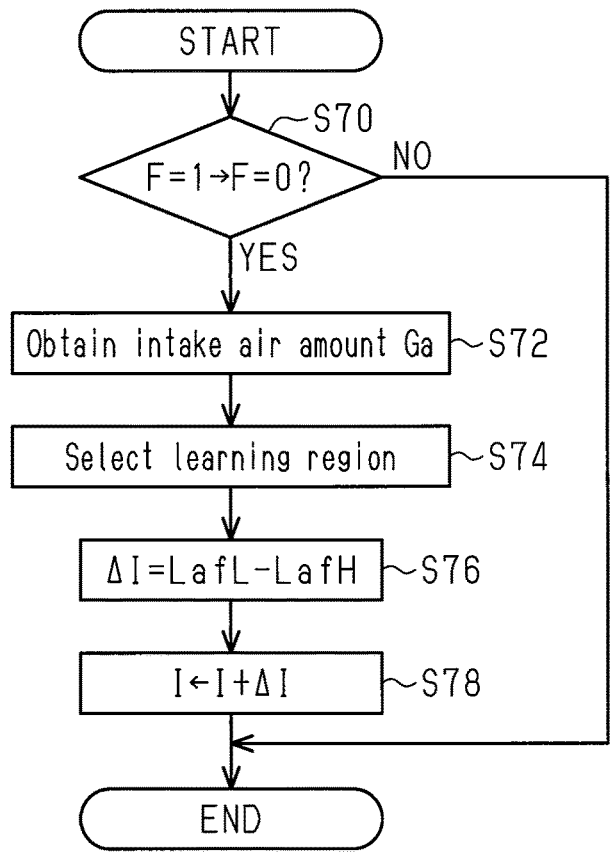
FIG. 7 is a flowchart showing a process performed when switching between a low temperature learning value and a high temperature learning value in a second embodiment.

FIG. 7 shows the procedures of a process executed when the fuel injection control is switched from that using the low temperature learning values LafL to that using the high temperature learning values LafH. The process shown in FIG. 7 is executed by the CPU 42 by running the programs stored in the memory 44. This accomplishes the process of the instructed injection amount calculation processor M16. The process shown in FIG. 7 is, for example, repeatedly executed in predetermined cycles.

In the sequence of the process shown in FIG. 7, the CPU 42 first determines whether or not the low temperature increase flag F is "1" in the previous control cycle and is "0" in the present control cycle (S70). This process is executed to determine whether or not the fuel injection control is switched from that using the low temperature learning value LafL to that using the high temperature learning value LafH. When the CPU 42 determines that the fuel injection control is switched (S70: YES), the CPU 42 obtains the intake air amount Ga (S72) and selects a learning region corresponding to the learning value used for the fuel injection control based on the obtained intake air amount Ga (S74). Then, the CPU 42 calculates a difference value ΔI, which is obtained by subtracting the high temperature learning value LafH of the selected learning region from the low temperature learning value LafL of the selected learning region (S76). The CPU 42 adds the difference value ΔI to a value I that is held in the integral element of the feedback processor M14 (S78).

When step S78 is completed or the negative determination is made in step S70, the CPU 42 temporarily ends the sequence of the process shown in FIG. 7.

The operation of the second embodiment will now be described.

Figure 8:
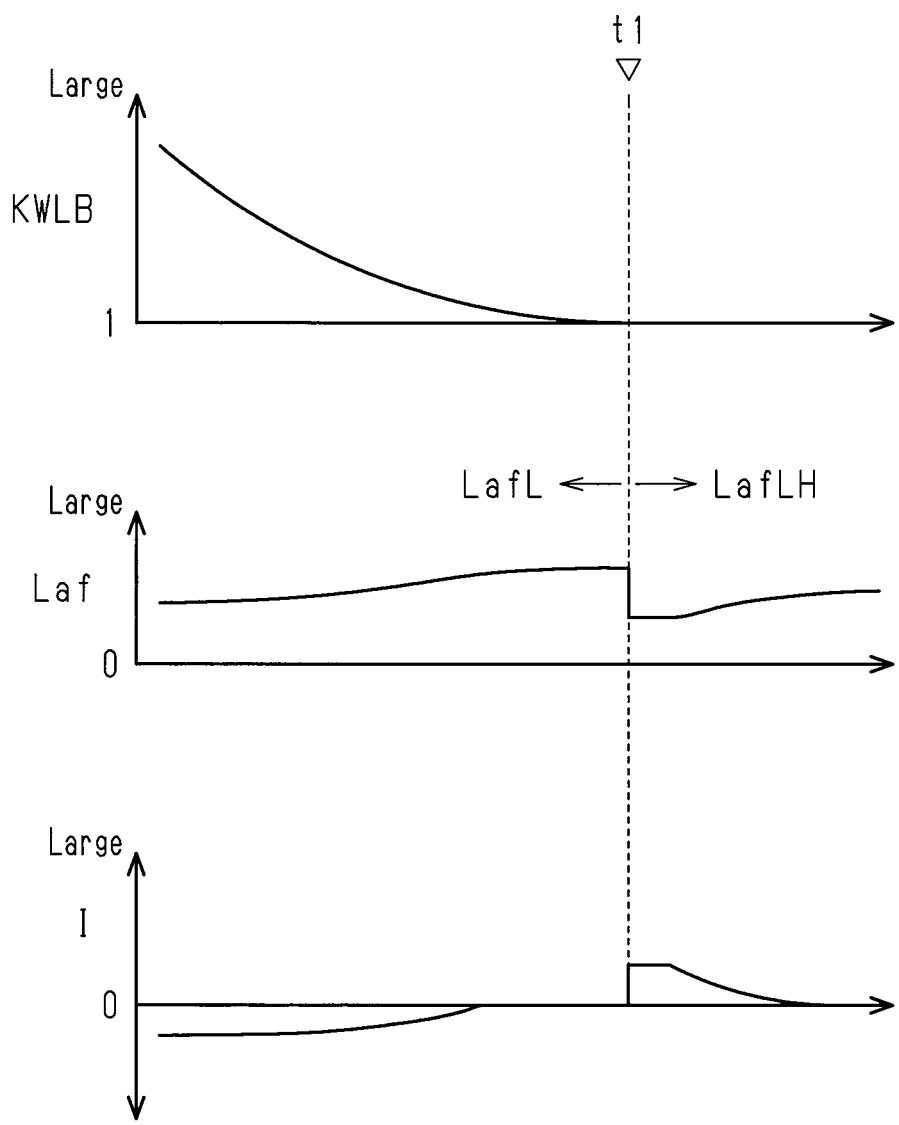
FIG. 8 includes time charts of an integral element correction process in the second embodiment.

FIG. 8 shows the transition of each of the increase coefficient KWLB, the learning value Laf used for the fuel injection control, and the value I held in the integral element. FIG. 8 shows an example of the learning value Laf that is decreased in a stepped manner at time t1 when the learning value Laf is switched from the low temperature learning value LafL to the high temperature learning value LafH. In this case, at time t1, the stepped change of the value I held in the integral element compensates for the stepped change of the learning value Laf. After time t1, if the value I held in the integral element is not appropriate for setting the output value Iaf to the target value Iaf*, the value I held in the integral element is gradually updated in accordance with the deviation of the output value Iaf from the target value Iaf*. This smoothly changes the value I held in the integral element. Additionally, if the value I held in the integral element is appropriate for setting the output value Iaf to the target value Iaf* and the absolute value of the value I is greater than zero, the high temperature learning value LafH is updated so as to become closer to the value I held in the integral element. Accordingly, the value I is gradually updated and smoothly decreased.

The second embodiment limits changes in the instructed injection amount Q* in a stepped manner that is caused by the switching of the learning value Laf used for the fuel injection control from the low temperature learning value LafL to the high temperature learning value LafH.

Third Embodiment

A third embodiment of an air-fuel ratio controller of an internal combustion engine will now be described with reference to the drawings. The description will focus on the differences from the first embodiment.

In the first embodiment, the accumulated air amount InG is used in the process for calculating the non-contributing correction rate Rnc. In the third embodiment, an accumulated injection amount InQb is used instead of the accumulated air amount InG.

Figure 9:
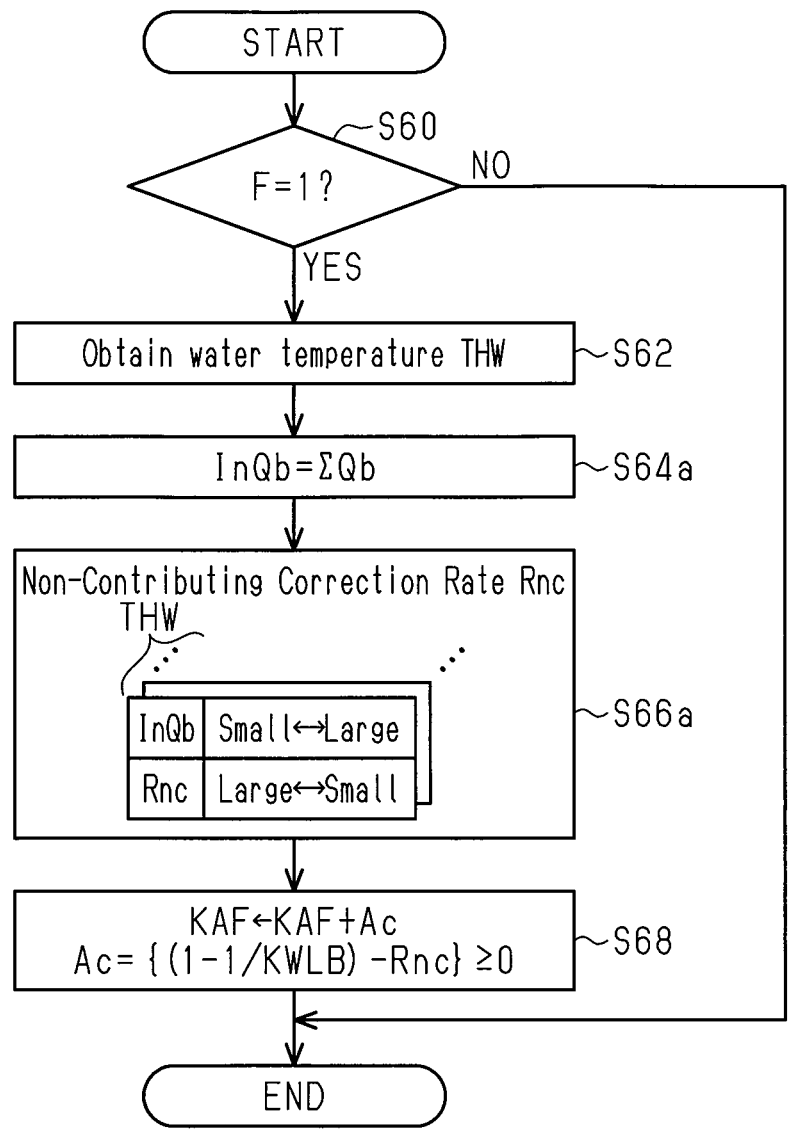
FIG. 9 is a flowchart showing the procedures of a process performed by a third embodiment of a learning correction processor.

FIG. 9 shows the process executed by the learning correction processor M18a of the third embodiment. The process shown in FIG. 9 is, for example, repeatedly executed in predetermined cycles. For the sake of simplicity, the same step numbers are given to steps of FIG. 9 corresponding to the process shown in FIG. 5. Such steps will not be described in detail.

In the sequence of the process shown in FIG. 9, when step S62 is completed, the CPU 42 updates the accumulated injection amount InQb, which is a value of the base injection amount Qb accumulated from when the internal combustion engine 10 is started (S64a). More specifically, the total amount of the base injection amount Qb injected within one control cycle of the sequence of the process shown in FIG. 9 is added to the accumulated injection amount InQb. This updates the accumulated injection amount InQb. The accumulated injection amount InQb is temporarily initialized to zero when the internal combustion engine 10 is started. Then, the base injection amount Qb is accumulated each time step S64a is executed.

The CPU 42 calculates the non-contributing correction rate Rnc based on the accumulated injection amount InQb and the water temperature TRW (S66a). More specifically, if the water temperature TRW is the same, when the accumulated injection amount InQb is large, the CPU 42 sets the non-contributing correction rate Rnc to a smaller value than when the accumulated injection amount InQb is small. If the accumulated injection amount InQb is the same, when the water temperature THW is high, the CPU 42 sets the non-contributing correction rate Rnc to a smaller value than when the water temperature THW is low. The accumulated injection amount InQb is used as a parameter that correlates with the total amount of combustion energy in the combustion chamber 24 accumulated from when the internal combustion engine 10 is started. The CPU 42 performs the calculation of step S66a using a two-dimensional map in which the accumulated injection amount InQb and the water temperature THW serve as input variables and the non-contributing correction rate Rnc serves as an output variable.

Fourth Embodiment

A fourth embodiment of an air-fuel ratio controller of an internal combustion engine will now be described with reference to the drawings. The description will focus on the differences from the first embodiment.

In the fourth embodiment, the internal combustion engine 10 shown in FIG. 1 includes a cylinder pressure sensor (not shown), which detects the pressure (cylinder pressure P) of the combustion chamber 24. In the first embodiment, the accumulated air amount InG is used in the process for calculating the non-contributing correction rate Rnc. In the fourth embodiment, an accumulated heat amount InQ, which is calculated based on the cylinder pressure, is used instead of the accumulated air amount InG.

Figure 10:
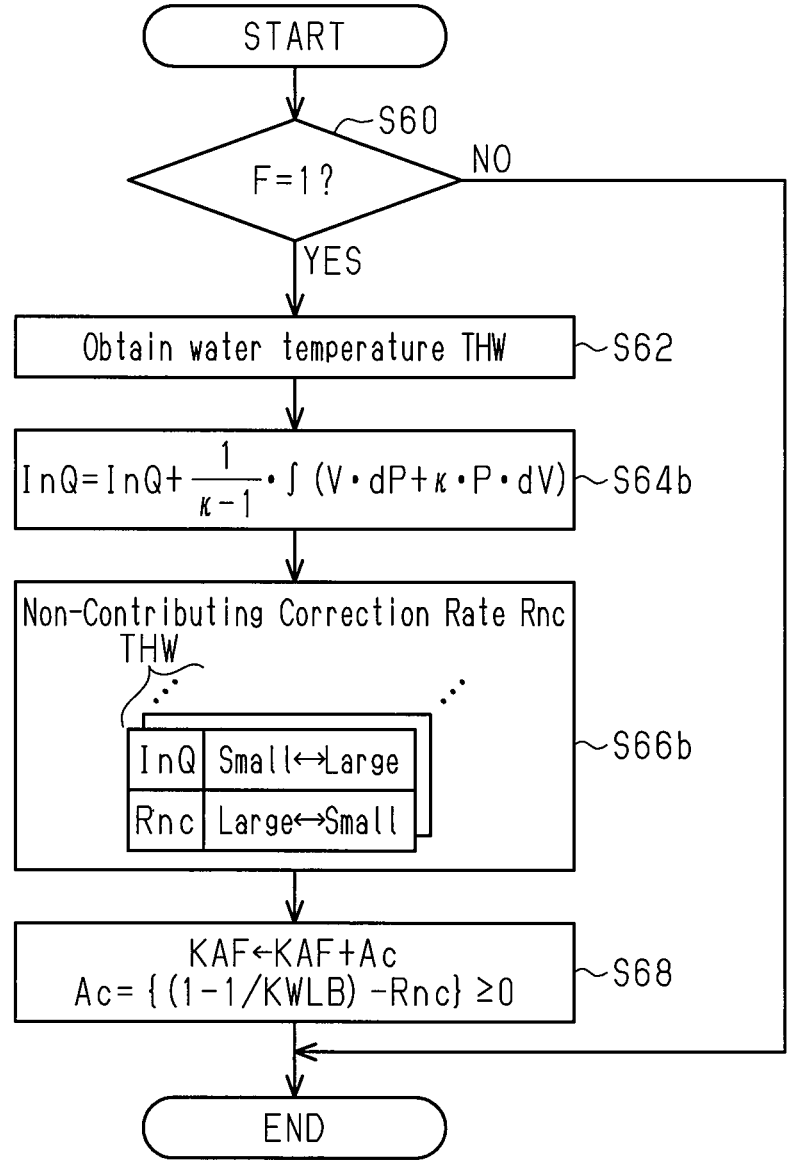
FIG. 10 is a flowchart showing the procedures of a process performed by a fourth embodiment of a learning correction processor.

FIG. 10 shows the process of the learning correction processor M18a of the fourth embodiment. The process shown in FIG. 10 is, for example, repeatedly executed in predetermined cycles. The same step numbers are given to steps of FIG. 10 corresponding to the process shown in FIG. 5. Such steps will not be described in detail.

In the sequence of the process shown in FIG. 10, when step S62 is completed, the CPU 42 updates the accumulated heat amount InQ, which is a value of the amount of heat that is generated in the combustion chamber 24 and accumulated from when the internal combustion engine 10 is started (S64b). More specifically, the amount of a heat amount Q accumulated during a period from step S64b of the previous sequence to step S64b of the present sequence of the process shown in FIG. 10 is added to the accumulated heat amount InQ. This updates the accumulated heat amount InQ. The accumulated heat amount InQ is temporarily initialized to "zero" when the internal combustion engine 10 is started. Then, the heat amount Q is accumulated in the process of step S64b.

The heat amount may be calculated through integration of the following expression (c1) based on time series data of the cylinder pressure P and a crank angle θ, which is obtained whenever calculated from the output signal Scr of the crank angle sensor 50 when the cylinder pressure P is detected.

$$dQ = (1/(k-1)) \cdot (V \cdot dP + \kappa \cdot P \cdot dV) \qquad (c1)$$

Here, V represents the volume, which is changed by the crank angle θ and calculated based on the crank angle θ. In the fourth embodiment, the specific heat K is a constant.

The CPU 42 calculates the non-contributing correction rate Rnc based on the accumulated heat amount InQ and the water temperature THW (S66b). More specifically, if the water temperature THW is the same, when the accumulated heat amount InQ is large, the CPU 42 sets the non-contributing correction rate Rnc to a smaller value than when the accumulated heat amount InQ is small. If the accumulated heat amount InQ is the same, when the water temperature THW is high, the CPU 42 sets the non-contributing correction rate Rnc to a smaller value than when the water temperature THW is low. The CPU 42 performs the calculation of step S66b using a two-dimensional map in which the accumulated heat amount InQ and the water temperature THW serve as input variables and the non-contributing correction rate Rnc serves as an output variable.

Correspondence Relationship

For the sake of brevity, "the CPU 42 that executes a predetermined process in accordance with the programs stored in the memory 44" is referred to as "the CPU 42 that executes a predetermined process."

The increase processor corresponds to the CPU 42 that executes steps S14 to S20, S24. The air-fuel ratio controller corresponds to the controller 40.

The enrichment processor corresponds to the target value setting processor M10 that sets the target value AF* to be richer than the stoichiometric air-fuel ratio when the water temperature THW is low.

The air amount accumulation processor corresponds to the CPU 42 that executes step S64.

The injection amount accumulation processor corresponds to the CPU 42 that executes step S64a.

The heat amount calculation processor corresponds to the CPU 42 that executes step S64b.

The update processor that updates a learning value taking into consideration the temperature of the coolant corresponds to the CPU 42 that executes steps S66, S66a, S66b.

A state in which the low temperature learning values are updated when the increase correction is performed corresponds to a state in which step S50 is executed under a condition in which the positive determination is made in step S46 of FIG. 4.

The addition processor corresponds to the CPU 42 that executes step S78.

Other Embodiments

At least one aspect of the above embodiments may be modified as follows.

"Accumulated Air Amount"

The accumulated air amount is not limited to the accumulated value of the intake air amount Ga, which is detected by the airflow meter 56. The accumulated air amount may be, for example, an accumulated value of a value obtained by multiplying the base injection amount Qb by the target value AF*. Alternatively, for example, instead of the intake air amount Ga, an accumulated value of the amount of air that fills the combustion chamber 24.

"Process for Calculating Non-Contributing Correction rate Based on Accumulated Air Amount"

In the process shown in FIG. 5, the non-contributing correction rate Rnc is sequentially calculated based on the two-dimensional map including the accumulated air amount InG, which is accumulated from when the internal combustion engine 10 is started, and each water temperature THW. Instead, for example, the water temperature THW obtained immediately after the internal combustion engine 10 is started may be constantly used as the water temperature THW, which serves as an input parameter used to sequentially calculate the non-contributing correction rate Rnc.

Alternatively, for example, a quadratic function in which the accumulated air amount InG and the water temperature THW each serve as an independent variable and the non-contributing correction rate Rnc serves as a dependent variable may be used.

Alternatively, the non-contributing correction rate Rnc may be calculated based on the temperature (intake air temperature) of air drawn into the combustion chamber 24 in addition to the accumulated air amount InG and the water temperature THW. In this case, when the intake air temperature is high, the temperature of the cylinder wall surface 21 is determined to be higher than when the intake air temperature is low. Thus, the non-contributing correction rate Rnc is calculated to be a small value. In this case, when an ambient temperature sensor is arranged, the detected value of the ambient temperature sensor may be used as the intake air temperature.

"Process for Calculating Non-Contributing Correction rate Based on Accumulated Injection Amount"

In the process shown in FIG. 9, the non-contributing correction rate Rnc is sequentially calculated based on the two-dimensional map including the accumulated injection amount. InQb, which is accumulated from when the internal combustion engine 10 is started, and each water temperature THW. Instead, for example, the water temperature TRW obtained immediately after the internal combustion engine 10 is started may be constantly used as the water temperature THW, which is an input parameter used to sequentially calculate the non-contributing correction rate Rnc.

Alternatively, for example, a quadratic function in which the accumulated injection amount InQb and the water temperature THW each serve as an independent variable and the non-contributing correction rate Rnc serves as a dependent variable may be used.

Alternatively, the non-contributing correction rate Rnc may be calculated based on the temperature (intake air temperature) of air drawn into the combustion chamber 24 in addition to the accumulated injection amount InQb and the water temperature THW. In this case, when the intake air temperature is high, it is assumed that the temperature of the cylinder wall surface 21 is higher than when the intake air temperature is low. Thus, the non-contributing correction rate Rnc is calculated to be a small value.

"Process for Calculating Non-Contributing Correction rate Based on Heat Amount"

In the above expression (c1) used to calculate the heat amount Q, the specific heat κ may be variably set in accordance with the target value AF*.

In the process shown in FIG. 10, the non-contributing correction rate Rnc is sequentially calculated based on the two-dimensional map including the accumulated heat amount InQ, which is accumulated from when the internal combustion engine 10 is started, and each water temperature THW. Instead, for example, the water temperature THW obtained immediately after the internal combustion engine 10 is started may be constantly used as the water temperature THW, which is an input parameter used to sequentially calculate the non-contributing correction rate Rnc.

Alternatively, for example, a quadratic function in which the accumulated heat amount InQ and the water temperature THW each serve as an independent variable and the non-contributing correction rate Rnc serves as a dependent variable may be used.

Alternatively, for example, a process for estimating the temperature of the cylinder wall surface 21 after one combustion cycle may be cyclically executed based on the heat amount Q, which is calculated by integration of the above expression (c1) performed in one combustion cycle, the intake air amount Ga, and the water temperature THW. The temperature of the cylinder wall surface 21 may be estimated taking into consideration the temperature (intake air temperature) of air drawn into the combustion chamber 24.

"Temperature of Cylinder Wall Surface 21"

Acknowledgement of the temperature of the cylinder wall surface 21 is not limited to indirect acknowledgement based on the accumulated air amount. InG, the accumulated injection amount InQb, the accumulated heat amount InQ, or the like. Instead, the temperature of the cylinder wall surface 21 may be acknowledged, for example, by a value detected by a sensor that detects the temperature of the cylinder wall surface 21.

"Low temperature learning Value LafL"

In the above embodiment, the condition in which the water temperature THW is greater than or equal to the allowed lower limit value TthL allows for the updating of the low temperature learning values LafL. Instead, for example, the allowed lower limit value TthL may be omitted. The low temperature learning value LafL may be updated when the water temperature THW is lower than or equal to the specified temperature Tth.

Additionally, the low temperature learning value LafL does not necessarily have to be used under a condition in which the water temperature THW is lower than or equal to the specified temperature Tth, which is the upper limit value of temperatures that allow for execution of the low temperature increasing process. For example, the learning value that is used may be switched between the high temperature learning value LafH and the low temperature learning value LafL by a border corresponding to a predetermined temperature that is higher than the upper limit temperature allowing for execution of the low temperature increase. More specifically, under a condition in which the water temperature THW is lower than or equal to the predetermined temperature, which is higher than the specified temperature Tth corresponding to the upper limit temperature that allows for execution of the low temperature increasing process, the low temperature learning value LafL may be used. Under a condition in which the water temperature THW is higher than the predetermined temperature, the high temperature learning value LafH may be used.

"High Temperature Learning Value and Low Temperature Learning Value"

The low temperature learning values LafL do not necessarily have to be learned separately from the high temperature learning values LafH. Also, the low temperature learning values LafL and the high temperature learning values LafH do not necessarily have to be learned for each of the learning regions separated by the intake air amount Ga.

"Feedback Processor"

In the first, third, and fourth embodiments, the feedback processor M14 includes the proportional element, the integral element, and the differential element. Instead of such a configuration, in one example, the feedback processor M14 may include the proportional element and the integral element. In another example, the feedback processor M14 may include only the proportional element.

In the second embodiment, the feedback processor M14 includes the proportional element, the integral element, and the differential element. Instead of such a configuration, in one example, the feedback processor M14 may include the proportional element and the integral element. In another example, the feedback processor M14 may include only the integral element.

When the feedback processor includes the integral element, whenever updating a learning value, a process for correcting the value held in the integral element may be executed in accordance h the updated amount of the learning value. For example, the value held in the integral element is decreased by the updated amount of the learning value.

"Average Operation Amount Calculation Processor M18$b$"

The average operation amount calculation processor M18$b$ is not limited to that performing the weighted moving average process on the feedback operation amount KAF. Instead, the average operation amount calculation processor M18$b$ may execute, for example, a process for calculating a predetermined number of simple moving averages. In this case, it is preferred that the predetermined number be 10 or greater.

The average operation amount KAFa is not limited to that calculated by the weighted moving average or the simple moving average of the feedback operation amount KAF. Instead, for example, even when the feedback operation amount KAF is the sum of an output value of the integral element and an output value of the proportional element, the average operation amount KAFa may be a weighted moving average or a simple moving average of the output value of the integral element. In this case, the output value of the integral element, which is the input of the weighted moving average process or the simple moving average process, only needs to be corrected by the enrichment contribution correction amount Ac.

"Selective Learning Processor M18$c$"

The selective learning processor M18$c$ is not limited to that increasing the absolute value of the update value $\Delta L$ of the learning value more as the difference between the average operation amount KAFa and "1" becomes greater. Instead, for example, the update value $\Delta L$ may be obtained by multiplying "KAFa-1" by a predetermined constant that is zero or greater and one or less.

"Update Processor"

The update processor does not necessarily have to execute the process for calculating the average operation amount KAFa. In one example, the update value $\Delta L$ may be calculated based on the output value of the integral element of the feedback processor M14. In another example, the update value $\Delta L$ may be obtained by multiplying "(output value of integral element)-1" by a predetermined constant (<1). In this case, the condition in which the amount of fluctuation in the output value of the integral element is less than or equal to a predetermined amount may allow for updating of the learning value. In this case, the output value of the integral element, which is the input of the process for calculating the update value $\Delta L$, only needs to be corrected by the enrichment contribution correction amount Ac.

For example, when the cycle for updating the integral element of the feedback processor M14 is longer than the cycle for updating the average operation amount KAFa, the feedback operation amount KAF may be corrected by the enrichment contribution correction amount Ac that has undergone the weighted moving average process or the simple moving average process. The weighted moving average process or the simple moving average process is performed on the enrichment contribution correction amount Ac to calculate the average of the enrichment contribution correction amount Ac obtained during a period equivalent to the cycle for updating the average operation amount KAFa.

The process for updating the learning value performed when the fuel is injected in the instructed injection amount Q* that has undergone the low temperature increase is not limited to that including a process for calculating the average operation amount KAFa after the enrichment contribution correction amount Ac is added to the feedback operation amount KAF. Instead, for example, the average operation amount KAFa may be corrected by adding the enrichment contribution correction amount Ac that has undergone the same weighted moving average process or simple moving average process as performed on the average operation amount KAFa to the average operation amount KAFa calculated from the feedback operation amount KAF that is not corrected by the enrichment contribution correction amount Ac. Moreover, the average operation amount KAFa may be corrected by adding the enrichment contribution correction amount Ac obtained at a predetermined timing to the average operation amount KAFa calculated from the feedback operation amount KAF that is not corrected by the enrichment contribution correction amount Ac.

The process for updating the learning value performed when the fuel is injected at the instructed injection amount Q* that has undergone the low temperature increase does not necessarily have to include calculation of the parameter that indicates the non-contributing portion, which is a portion of the correction amount that is increased by the low temperature increasing process and does not contribute to enrichment. Instead, the process may include calculation of a parameter that indicates the contributing portion, which is a portion of the correction amount that is increased by the low temperature increasing process and contributes to enrichment. This calculation may be achieved, for example, using a contribution coefficient Kc ($0<Kc<1$). The enrichment contribution correction amount Ac is set to "$\{1-1/(KWLE \cdot Kc)\}$." Alternatively, the calculation may be achieved, for example, by calculating a correction amount $\Delta Lc$, which is added to he update value $\Delta L$ so that the update value $\Delta L$ undergoes an addition correction. In this case, the update value $\Delta L$ is calculated based on the average operation amount KAFa calculated from the average operation amount KAFa that is not corrected by the enrichment contribution correction amount Ac. When the temperature of the cylinder wall surface 21 is high, the contribution coefficient Kc and the correction amount $\Delta Lc$ each have a larger value than when the temperature of the cylinder wall surface 21 is low. The parameter used to calculate the non-contributing correction rate Rue may be used as the parameter for calculating the contribution coefficient Kc and the correction amount $\Delta Lc$.

"Addition Processor"

In the second embodiment, the difference value $\Delta I$ is obtained by subtracting the high temperature learning value LafH of a particular learning region from the low temperature learning value LafL of the particular learning region. The difference value $\Delta I$ is added to the value I held in the integral element. Instead, for example, if the CPU 42 calculates the learning value used for the fuel injection control through interpolation of learning values of a plurality of learning regions, the difference value $\Delta I$ may be obtained by subtracting a value calculated through interpolation of the high temperature learning value LafH of each learning region from a value calculated through interpolation of the low temperature learning value LafL of each learning region. The process for calculating the learning value for the fuel injection control through interpolation may be performed, for example, by setting representative points of the learning regions and setting the learning value of each learning region to the value of the corresponding representative point. When the present intake air amount Ga does not conform to any one of the representative points, the weighted moving average process may be performed on the learning values of the adjacent two representative points. In this case, the weight coefficient of the weighted moving average process only needs to be increased as the distance between the present intake air amount Ga and the representative point becomes shorter.

"Target Value of Air-Fuel Ratio"

In the above embodiments, when the low temperature increase process is performed, the target value AF* of the air-fuel ratio is set to be richer than the stoichiometric air-fuel ratio. When the low temperature increase process is not performed, the target value AF* is set to the stoichiometric air-fuel ratio. However, the configuration is not limited in such a manner.

"Controller"

The controller 40 is not limited to that including the CPU 42 and the memory 44 and performing a software process on each of the above various processes. Instead, a controller may include an ASIC that executes at least a portion of the processes. For example, the controller includes a dedicated hardware (application specific integrated circuit: ASIC) that executes the process of the average operation amount calculation processor M18b. More specifically, the controller may include, for example, control circuitry, which is, more specifically, one or more dedicated hardware circuits such as ASICs, one or more processors (microcomputers) that operate in accordance with computer programs (software), or the combination of these.

"Fuel Injection Valve"

In the above embodiments, a port injection value that injects the fuel into the intake passage 12 is illustrated as the fuel injection valve. Instead, for example, a direct injection valve that injects the fuel into the combustion chamber 24 may be used. Alternatively, for example, the internal combustion engine 10 may include a direct injection valve and a port injection valve. In this case, it is desirable that the learning values be separately assigned to the direct injection valve and the port injection valve. In this case, if "KPFI·100%" of "Qb·KAF·KWLB" is injected from the port injection valve, when the water temperature THW is lower than or equal to the specified temperature Tth, the following setting is desirable. The instructed injection amount for the port injection valve is set to "Qb·KAF·KWLB·KPFI·Lp" where Lp represents the learning value for the port injection The instructed injection amount for the direct injection valve is set to "Qb·KAF·KWLB·(1-KPFI)·Ld" where Ld represents the learning value for the direct injection valve.

In this case, the port injection valve learning value Lp may be used even when KPFI is "1." Also, the direct injection valve learning value Ld may be used even when KPFI is "0." Alternatively, the learning value may be separately assigned for each of cases in which KPFI is "1," "0," and neither of "1" and "0."

"Open-Loop Processor"

The intake air amount Ga may not be directly used to calculate the base injection amount Qb. Instead, the intake air amount Ga may be used only to correct the air model in a steady state. The base injection amount Qb may be calculated based on the cylinder intake air amount that is estimated from the air model.

Therefore, the present examples and embodiments are to be considered as illustrative and not restrictive and the invention is not to be limited to the details given herein, but may be modified within the scope and equivalence of the appended claims.

The invention claimed is:

1. An air-fuel ratio controller of an internal combustion engine, the air-fuel ratio controller comprising:
    an open-loop processor configured to set a base injection amount, which is an open-loop operation amount that controls an air-fuel ratio to a target value;
    a feedback processor configured to calculate a feedback operation amount that controls a detected value of the air-fuel ratio, which is obtained by an air-fuel ratio sensor arranged in an exhaust passage of an internal combustion engine, to the target value;
    an increase processor configured to perform an increase correction on the base injection amount when a temperature of the internal combustion engine is lower than or equal to a specified temperature;
    an operation processor configured to operate a fuel injection valve based on the base injection amount on which the increase processor has performed the increase correction, wherein the base injection amount is corrected using the feedback operation amount and a learning value; and
    an update processor configured to update the learning value based on the feedback operation amount, wherein
    the internal combustion engine includes a cylinder wall surface, and
    if the increase processor performs the increase correction, when a temperature of the cylinder wall surface is high, the update processor is configured to update the learning value so that the learning value increases an increase correction rate of the base injection amount as compared to when the temperature of the cylinder wall surface is low.

2. The air-fuel ratio controller according to claim 1, further comprising an enrichment processor configured to set the target value to be rich when the increase processor performs the increase correction as compared to when the increase processor does not perform the increase correction.

3. The air-fuel ratio controller according to claim 1, wherein
    the update processor includes an air amount accumulation processor configured to calculate an accumulated air amount, which is an accumulated amount of an intake air amount of the internal combustion engine, and
    the update processor is configured to update the learning value using the accumulated air amount as a parameter that correlates with the temperature of the cylinder wall surface.

4. The air-fuel ratio controller according to claim 3, wherein
    the internal combustion engine includes coolant, and
    the update processor is configured to update the learning value based on the parameter and a temperature of the coolant.

5. The air-fuel ratio controller according to claim 1, wherein
    the update processor includes an injection amount accumulation processor configured to calculate an accumulated injection amount, which is an accumulated amount of the base injection amount, and
    the update processor is configured to update the learning value using the accumulated injection amount as a parameter that correlates with the temperature of the cylinder wall surface.

6. The air-fuel ratio controller according to claim 1, wherein
    the internal combustion engine includes a combustion chamber,
    the update processor includes a heat amount calculation processor configured to calculate a heat amount generated in the combustion chamber of the internal combustion engine based on time series data of a detected value of pressure of the combustion chamber of the internal combustion engine, and
    the update processor is configured to update the learning value using the heat amount as a parameter that correlates with the temperature of the cylinder wall surface.

7. The air-fuel ratio controller according to claim 1, wherein
    the learning value includes a high temperature learning value, which is used when the temperature of the internal combustion engine is higher than a predetermined temperature, and a low temperature learning value, which is used when the temperature of the internal combustion engine is lower than or equal to the predetermined temperature,
    when the temperature of the internal combustion engine is higher than the specified temperature, the operation processor is configured to operate the fuel injection valve based on the base injection amount that is corrected using the feedback operation amount and the learning value,
    the predetermined temperature is higher than or equal to the specified temperature, and
    when the increase processor performs the increase correction, the update processor is configured to update the low temperature learning value.

8. The air-fuel ratio controller according to claim 7, wherein
    the feedback processor includes an integral element to which a difference between the detected value and the target value is input,
    the feedback operation amount is calculated based on an output value of the integral element, and
    the air-fuel ratio controller further comprises an addition processor configured to add a difference value, which is obtained by subtracting the high temperature learning value from the low temperature learning value, to a value held in the integral element when the learning value that is used to correct the base injection amount is switched from the low temperature learning value to the high temperature learning value.

9. A method for controlling an air-fuel ratio of an internal combustion engine, the method comprising:
    setting a base injection, amount, which is an open-loop operation amount that controls an air-fuel ratio to a target value;
    calculating a feedback operation amount that controls a detected value of the air-fuel ratio, which is obtained by an air-fuel ratio sensor arranged in an exhaust passage of an internal combustion engine, to the target value;
    performing an increase correction on the base injection amount when a temperature of the internal combustion engine is lower than or equal to a specified temperature;
    operating a fuel injection valve based on the base injection amount on which the increase correction has been performed, wherein the base injection amount is corrected using the feedback operation amount and a learning value; and updating the learning value based on the feedback operation amount, wherein the internal combustion engine includes a cylinder wall surface, and if the increase correction is performed, when a temperature of the cylinder wall surface is high, the learning value is updated so that the learning value increases an increase correction rate of the base injection amount as compared to when the temperature of the cylinder wall surface is low.

10. An air-fuel ratio controller of an internal combustion engine, the air-fuel ratio controller comprising:

circuitry configured to set a base injection amount, which is an open-loop operation amount that controls an air-fuel ratio to a target value, calculate a feedback operation amount that controls a detected value of the air-fuel ratio, which is obtained by an air-fuel ratio sensor arranged in an exhaust passage of an internal combustion engine, to the target value, perform an increase correction on the base injection amount when a temperature of the internal combustion engine is lower than or equal to a specified temperature, operate a fuel injection valve based on the base injection amount on which the increase correction has been performed, wherein the base injection amount is corrected using the feedback operation amount and a learning value, and update the learning value based on the feedback operation amount, the internal combustion engine includes a cylinder wall surface, and if the increase correction is performed, when a temperature of the cylinder wall surface is high, the learning value is updated so that the learning value increases an increase correction rate of the base injection amount as compared to when the temperature of the cylinder wall surface is low.

* * * * *